United States Patent
Melzer et al.

(10) Patent No.: US 6,603,615 B2
(45) Date of Patent: Aug. 5, 2003

(54) PRECISION POSITIONING APPARATUS FOR POSITIONING A COMPONENT ESPECIALLY AN OPTICAL COMPONENT

(75) Inventors: Frank Melzer, Utzmemmingen (DE); Martin Bayer, Roedental (DE)

(73) Assignee: Carl-Zeiss-Stiftung (DE)

( * ) Notice: Subject to any disclaimer, the term of this patent is extended or adjusted under 35 U.S.C. 154(b) by 44 days.

(21) Appl. No.: 09/866,089

(22) Filed: May 25, 2001

(65) Prior Publication Data

US 2002/0021504 A1 Feb. 21, 2002

(30) Foreign Application Priority Data

May 27, 2000 (DE) .......................................... 100 26 541

(51) Int. Cl.[7] ............................. G02B 7/02; G02B 15/14
(52) U.S. Cl. ....................... 359/823; 359/819; 359/827; 359/830; 359/694
(58) Field of Search ................................ 359/822, 823, 359/827, 829, 830, 405, 694; 474/161

(56) References Cited

U.S. PATENT DOCUMENTS

| | | | | |
|---|---|---|---|---|
| 3,888,563 A | * | 6/1975 | Dierkes | 359/405 |
| 5,069,654 A | * | 12/1991 | Rampe | 474/161 |
| 5,136,433 A | * | 8/1992 | Durell | 359/829 |
| 5,150,260 A | * | 9/1992 | Chigira | 359/694 |
| 6,086,209 A | | 7/2000 | Miyahara et al. | 359/872 |

* cited by examiner

Primary Examiner—Evelyn Lester
Assistant Examiner—Gary O'Neill
(74) Attorney, Agent, or Firm—Wells St. John P.S.

(57) ABSTRACT

An apparatus for the precision positioning of an optical component a group of lenses or mirror, in the axial direction and/or for tilting the component and has an axial adjustment device and/or a tilting device. The axial adjustment device has an adjusting nut that includes a guide ring and a clamping ring. The two rings are connected to one another elastically via a blade. Individual clamping jaws are formed by axial incisions in the clamping ring and are braced with the guide ring via tensioning members. The tilting device has an inner and an outer tilting part. The inner tilting part is connected to the outer tilting part via torsion joints, and the outer tilting part is connected to a bearing part via torsion joints.

18 Claims, 3 Drawing Sheets

Figure 1:
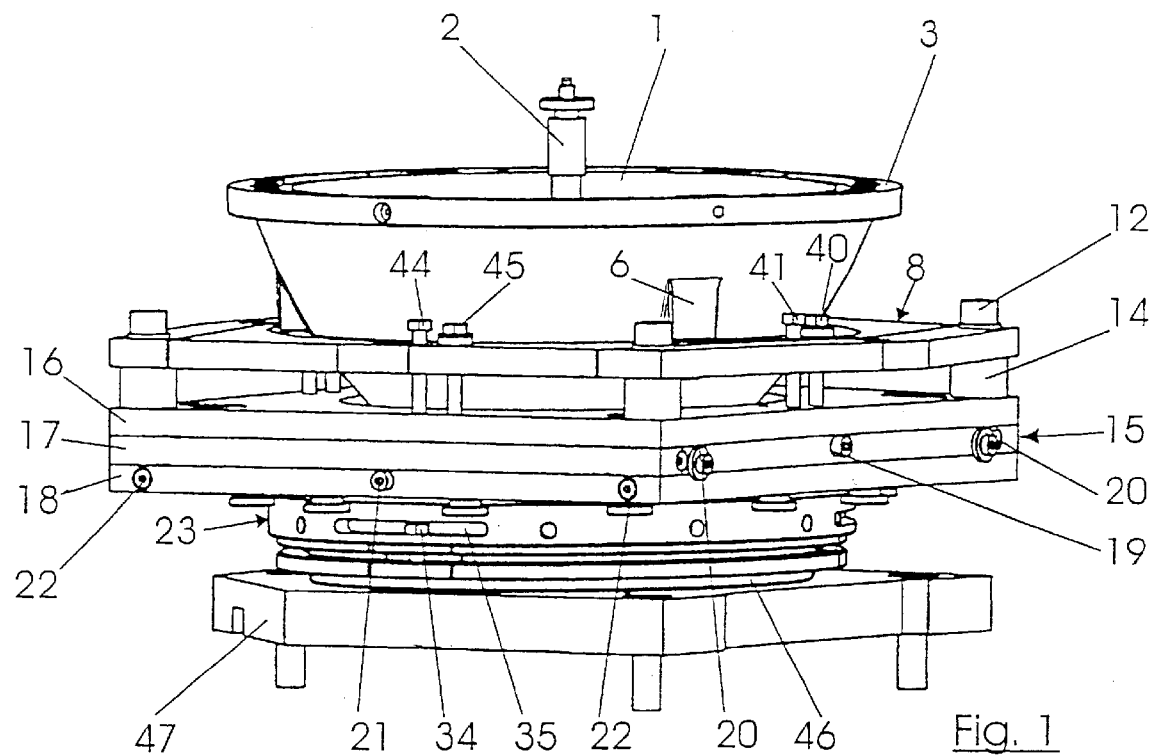

PRECISION POSITIONING APPARATUS FOR POSITIONING A COMPONENT ESPECIALLY AN OPTICAL COMPONENT

CROSS REFERENCE TO RELATED APPLICATION

This application relates to and claims priority to corresponding German Patent Application No. 100 26 541.3, which was filed on May 27, 2000, and which is incorporated by reference herein.

The invention relates to a precision positioning apparatus for positioning a component, especially an optical component, such as a set of lenses or mirror, of the type defined in detail in the preamble of claim 1.

Components, especially optical components, frequently require very precise positioning or alignment because they are interactive with other components or because they are used for taking very accurate measurements. In optics, for example, this applies to sets of lenses or mirrors. Thus, for example, very precise axial and/or vertical adjustment is necessary in mirrors, including especially ellipsoid mirrors, for lighting systems, especially in the deep ultraviolet (DUV) range. Normal threads for mounting and guidance are unsuitable for this, since, because of the play necessarily existing at the flanks of the thread, tilting movements and displacements of a nut result in wobble phenomena in the plane perpendicular to the screwing direction, in other words the bearing surface of the nut.

The Spieth company of 73730 Esslingen offers lock nuts under the name "Spieth-Stellmuttern" for general mechanical engineering. The lock nuts consist of a guide ring and a clamping ring, the two rings being connected to one another elastically. An axially elastic blade or a division in the guide ring and the clamping ring is formed by two closely adjacent perforations from the inside and the outside of the lock nut. The play at the flanks of the thread is eliminated, in other words freedom from play is achieved, by a bracing applied by screws between the guide ring and the clamping ring.

It has proved to be a disadvantage of the "Spieth lock nuts", however, that they tend to be subject to seizing phenomena when adjusted in the prestressed state, because the clamping in the axial direction takes place over the entire circumference. Adjustment of the pretensioned lock nuts is thus impossible. If the prestress is released again to permit adjustment, the wobble phenomena described above recur. This means that exact adjustment and mounting of components, especially of high-precision optical components, becomes very difficult.

Various tilting apparatuses are known for exact angular setting and/or enact setting and adjustment of the tilt of a component. Thus, for example, a tilting apparatus is known for an ellipsoid mirror in which the mirror is adjusted and fixed by means of three screws. A disadvantage here, however, is that the adjustment of one screw always results in the rotation of the focus around the axis through the bearing points of the other two screws. This means that, as a result, the focus of the mirror migrates out of the optical axis of the following optical elements, as a result of which exact adjustment of the ellipsoid mirror entails a high level of effort.

It is therefore an object of the present invention to provide an apparatus of the type mentioned initially whereby the above mentioned disadvantages of the prior art are eliminated, especially one whereby exact adjustment without the risk of seizing during adjustment in the axial direction is possible and/or whereby migration of the focus or the axis of a component to be tilted is avoided, With the apparatus according to the invention, precise positioning of a component, especially of an optical component, such as for example a set of lenses or a mirror, can be achieved in both the axial and radial directions.

In a very advantageous embodiment of the invention, provision may be made for the axial adjustment device to possess a spindle onto which an adjusting nut can be screwed, the adjusting nut being composed of a guide ring and a clamping ring and the two rings being connected to one another elastically, the clamping ring being capable of being braced against the guide ring via clamping members to eliminate the lateral play of the adjusting nut, wherein individual clamping jaws are formed by incisions in the clamping ring and can each be braced with the guide ring via the clamping members.

As a result of the incisions in the clamping ring, which advantageously extend in the axial direction or at least approximately in the axial direction, discrete or individual clamping jaws are formed. An adjustment in the prestressed state is thus possible without seizing phenomena, since, as a result of the clamping jaws, which are designed for example as short annular segments, engaging differently in the thread, a scraping effect similar to that obtained with a screw-tap occurs.

When provision is made, in an embodiment of the invention, for three clamping jaws or annular segments to be provided, distributed over the circumference, a statically determined three-point bearing is created. It is thus possible to fix the adjusting or setting nut without significant misadjustment because of the three-point bearing.

The apparatus according to the invention can be produced, in particular, for mounting and adjusting optical components such as, for example, an ellipsoid mirror on large thread diameters with a short overall length.

A very advantageous embodiment of a tilting device can comprise one in which the tilting device possesses an inner tilting part and an outer tilting part, the inner tilting part being connected directly or indirectly to the component to be tilted and being connected externally via torsion joints to the outer tilting part, which in turn is connected via torsion joints to a bearing part.

The tilting device according to the invention results in a cardanic suspension. The torsion joints may be formed here as "normal" joints or, in an advantageous manner, are formed as "solid state joints", in which, for example, a disk is divided by fine cuts so as to produce two rings, specifically an inner ring and an outer ring, which are connected to one another in each case by thin webs and which, for example, form a cardanic disk by means of reciprocally opposite webs and webs arranged at right angles thereto.

In a very advantageous and non-obvious refinement of the invention, provision may be wade for the torsion joints to be so arranged that, when used or an ellipsoid mirror, the neutral axes of the torsion joints point through the focus of the ellipsoid. In this manner, a simple and axis-independent adjustment is achieved.

In this case the reflector of the ellipsoid is located within the inner ring. The tilting device according to the invention provides the possibility of tilting through the focus of an ellipsoid mirror about two axes.

A further advantage of the tilting device according to the invention resides in the fact that only rough production and assembly tolerances are necessary. In addition, only a small structural space is needed. Furthermore, the installation effort is low.

The claimed invention is specially adapted for mounts of a big inner diameter as described in claim 18.

Figure 2:
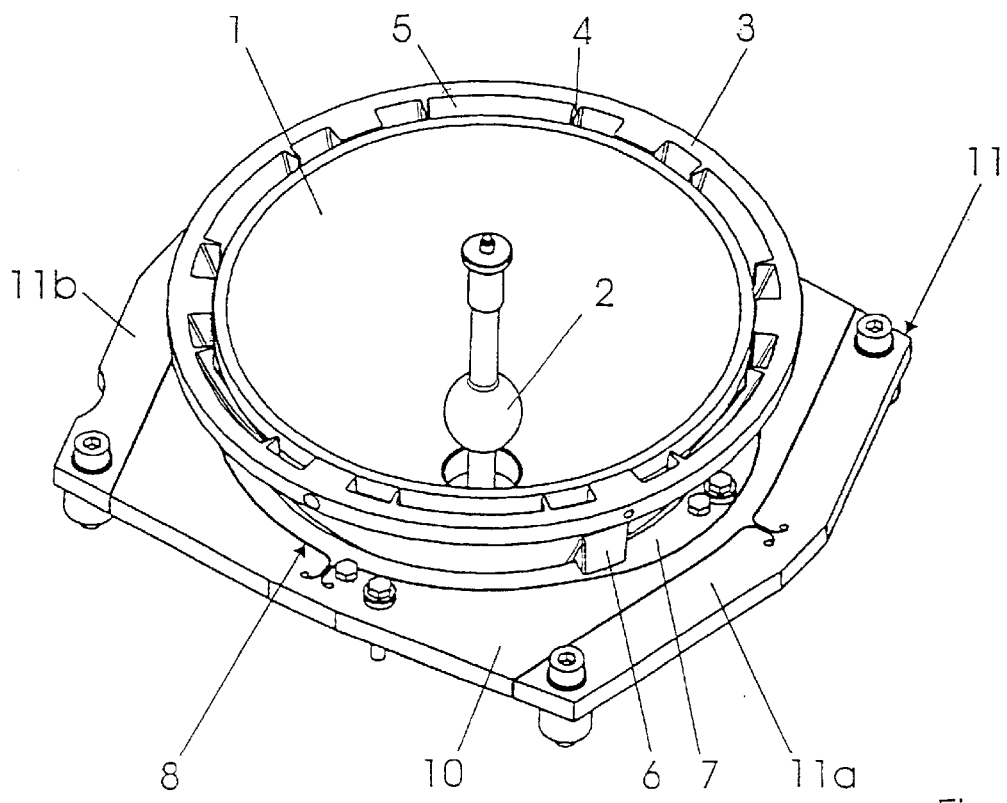
Figure 3:
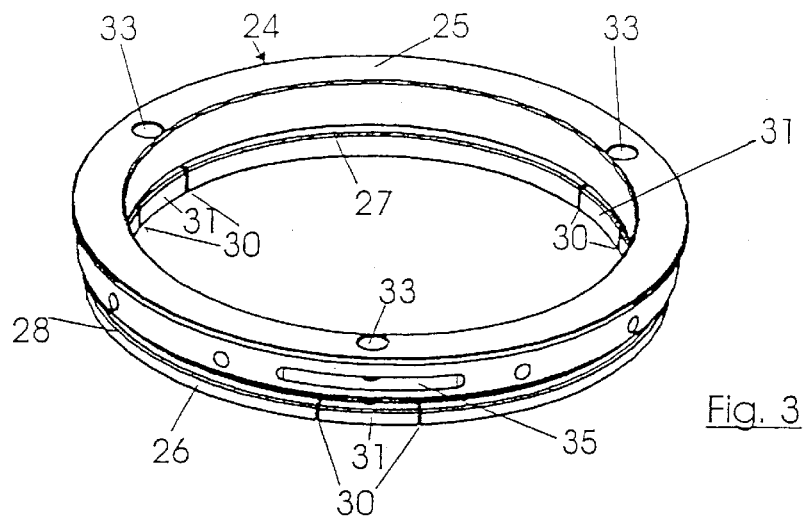
Figure 4:
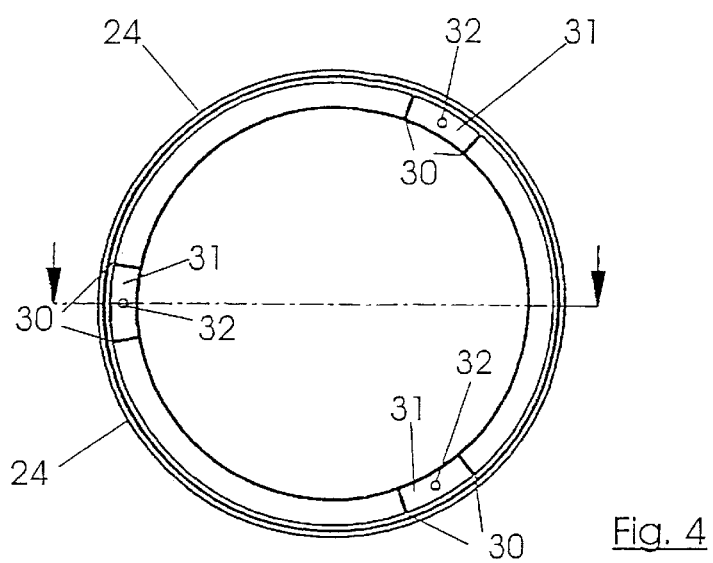
Figure 5:
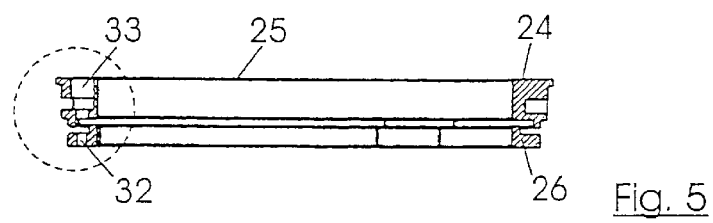
Figure 6:
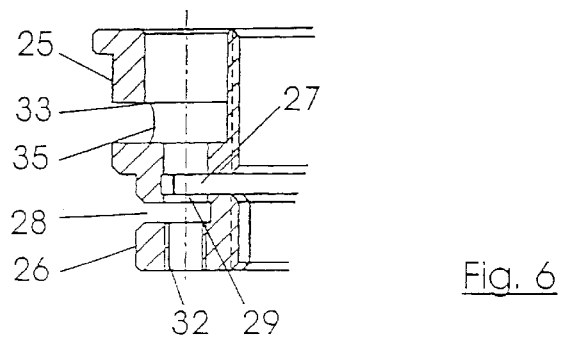
Figure 7:
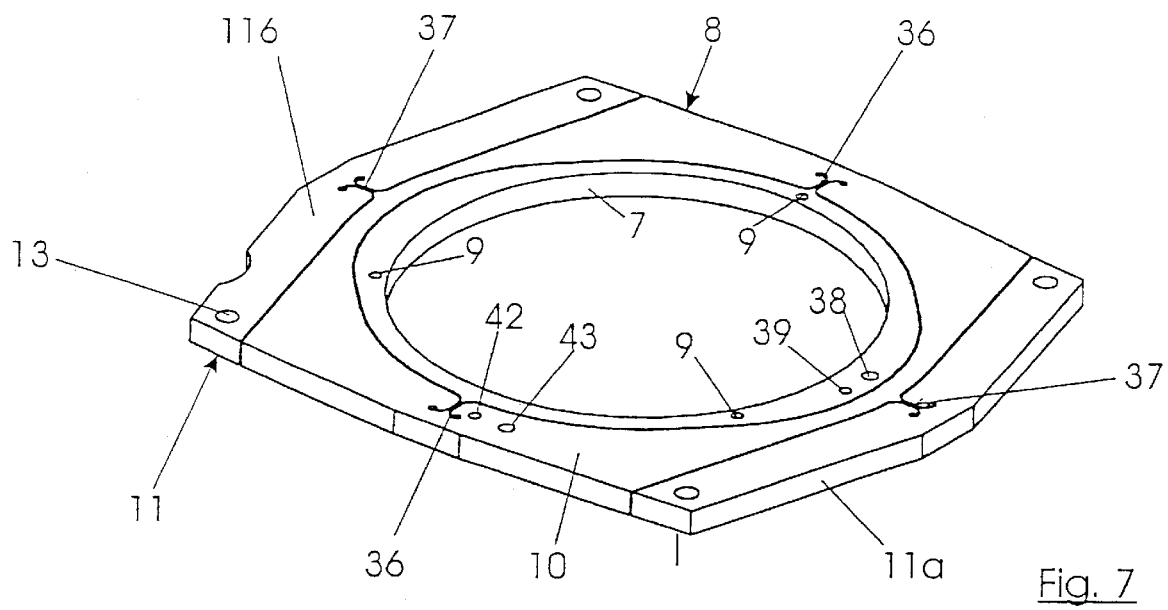
Figure 8:
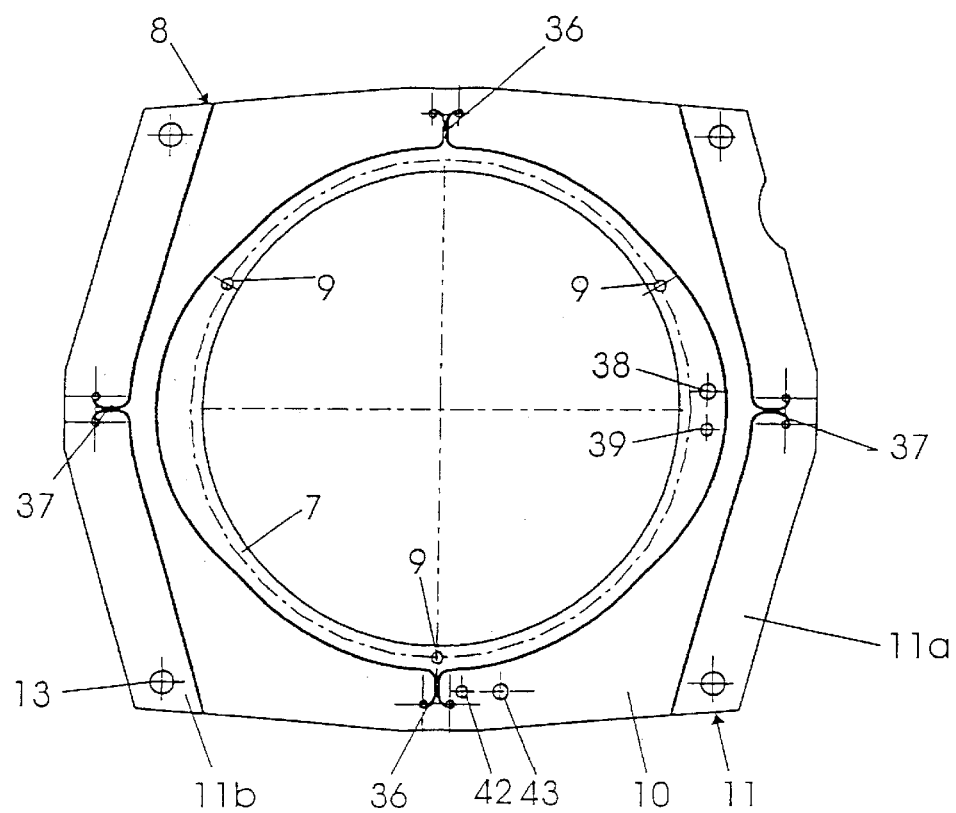

An example of embodiment, from which further features of the invention are apparent, is described below by way of principle with reference to the drawing, in which:

FIG. 1 shows an overall view of an ellipsoid mirror as a lighting module, with a lamp, FIG. 2 shows a perspective plan view of the upper part of the ellipsoid mirror shown in FIG. 1, FIG. 3 shows a perspective view of a vertical adjustment device for the ellipsoid mirror shown in FIGS. 1 and 2, only the, tensioning nut being shown, FIG. 4 shows a view of the tensioning nut shown in FIG. 3 from below, FIG. 5 shows a section along the line V—V in FIG. 4, FIG. 6 shows an enlargement of the detail x in FIG. 5, FIG. 7 shows a perspective view of the tilting device for the ellipsoid mirror shown in FIGS. 1 and 2, and FIG. 8 shows a plan view of the tilting device shown in FIG. 7.

The ellipsoid mirror, as a lighting module, shown in FIGS. 1 and 2 is in principle of a known structural type, for which reason only those parts essential to the invention will be described in detail below.

The ellipsoid mirror possesses a reflector 1, a lamp 2 being arranged in its longitudinal axis. The reflector 1 is mounted in a mounting 3, which may be provided with cooling fins 4 and cooling channels 5 for cooling purposes.

The mounting 3 is connected via three threaded feet 6, arranged distributed over the circumference, to an inner ring 7 as an inner tilting part of a tilting device 8. To this end, the inner ring 7 correspondingly has three bores 9, into which screws (not shown) are pushed through and screwed into threaded holes in the threaded feet 6. The inner ring 7 is surrounded by an outer ring 10 as an outer tilting part, which in turn is connected externally to a bearing part 11. The bearing part 11 is formed by two reciprocally opposite bearing webs 11A and 11B.

The bearing part 11 is connected via four mounting screws 12, distributed over the circumference and inserted through holes 13 in the two bearing webs 11A and 11B, and via intervening spacer sleeves 14 to an adjustment device 15 for the x and y directions located below. The adjustment device may possess, for example, three adjustment plates 16, 17 and 18 lying one above the other. The adjustment device described is fixedly connected to the upper plate 16 by screws 12. The plate 16 is displaced relative to the plate 17 in one direction, for example in the y direction, by means of the adjusting screw 19 and the resilient pressure pieces 20. The lateral guidance can be provided by an overlap by means of disks. The screw 19 pulls the adjustment plate 16 in one direction, while the pressure pieces 20 restore the adjustment plate 16 again.

The plate 17 is displaced in the same way relative to the plate 18 in a direction of adjustment (x direction) offset by 90° relative to the direction described above. The plate 18 lies on the vertical adjustment device 23 in a manner proof against twisting and is thus displaceable in the vertical direction (z direction).

Below the adjustment device 15 is an axial adjustment device or vertical adjustment device 23 for the ellipsoid mirror.

The vertical adjustment device 23 can be seen in detail in FIGS. 3 to 6.

The vertical adjustment device 23 possesses an adjusting nut 24 which is screwed onto a spindle 46. The spindle 46 is fixed on a baseplate 47 of the ellipsoid mirror. The adjusting nut 24 has a guide ring 25 and a clamping ring 26. Closely adjacent perforations 27 and 28 are made in the adjusting nut 24 from the inside and from the outside. In this manner, an elastic connection or blade 29 is formed between the guide ring 25 and the clamping ring 26, elasticity in the axial direction being achieved.

By means of axial incisions 30 into the clamping ring 26, which are made in pairs at a short distance apart in each case, individual clamping jaws in the form of annular segments 31 are formed. It is apparent from FIGS. 3 and 4 that, by means of six incisions 30, three clamping jaws 31 each distant from the next by 120° are formed. Each clamping jaw is provided with a threaded hole 32, each of which is aligned with a hole 33 located in the guide ring 25. A tensioning screw 34 is inserted into the hole 33 as a tensioning member and screwed into the threaded hole 32 of the clamping ring 26. One of the three tensioning screws 34 is shown in FIG. 1, and it is also apparent here that accessibility of the clamping screw 34 for adjustment is ensured via elongate slits 35 in the circumferential wall of the guide ring 25. The screw may also be screwed into the guide ring from below. In this case there are no elongate slits in the design.

After positioning of the adjusting nut 24 on the spindle 46, exact adjustment with freedom from play is achieved by adjusting the tensioning screws 34, the guide ring 25 lying with its free end face flat on the lower adjustment plate 18, which also provides security against twisting. As a result of the fact that the tensioning screws 34 each engage only discretely on the three clamping jaws 31 arranged distributed over the circumference, the whole adjusting nut 24 can still be twisted without play for adjustment, and this is possible without seizing phenomena occurring, because the bracing or freedom from play occurs only in the regions of the clamping jaws 31. As production tolerances and other inaccuracies are never avoidable, and on the other hand the ellipsoid mirror has to be set to a particular position, this can be achieved by a corresponding play-free adjustment of the adjusting nut 24. For exact positioning, the adjusting nut is twisted accordingly, as a result of which, because of the contact between the adjusting nut and the adjustment plate 18, the whole ellipsoid mirror is adjustable axially or vertically.

The mode of operation of the tilting device 8 is described in detail below, with reference to FIGS. 7 and 8, in conjunction with FIG. 2.

As can be seen, the tilting device 8 consists of a one-piece unit, the separation between the inner ring 7, the outer ring 10 and the two bearing webs 11A and 11B being created by thin cuts, for example by means of a laser or wire erosion. The connection between the individual parts is provided in each case by two reciprocally opposite narrow webs as a residual connection to form torsion joints. To this end, two reciprocally opposite torsion joints 36 are located as connecting points between the inner ring 7 and the outer ring 10 and, offset at 90° relative thereto, two likewise mutually opposite torsion joints 37 are located as solid-state joints between the outer ring 10 and the two bearing webs 11A and 11B.

Between the two torsion joints 36, and offset in each case by 90° relative thereto, two holes 38 and 39 are arranged side by side, a tension screw 40 being inserted through the hole 38 and screwed into 4 threaded hole in the plate 16, and a pressure screw 41 being screwed into the threaded hole 39 and bearing on he adjustment plate 16 of the adjustment device 15 (see FIG. 1).

In the same way, two holes 42 and 43 are located in the outer ring 10 and are offset by at least approximately 90° relative to the two torsion joints 37. One pressure screw 44 and one tension screw 45 in each case are again inserted into the two holes 42 and 43 and are supported in the same way as the screws 40 and 41 (again, see FIG. 1).

By adjustment of the screws 40 and 41 and the screws 44 and 45, the inner ring 7 and outer ring 10 can be tilted relative to one another, this being possible because of the chosen cardanic arrangement. In this manner, the mounting 3 and hence also the reflector can be exactly adjusted.

The position of the torsion joints 36 and 37 is selected so that their neutral axes pass through the focus of the ellipsoid. The lamp 2 is located in the focus and hence also in the focal point of the elliptical mirror. With the tilting device described above, an axis-neutral tilting is achieved, in other words the tilting about one axis does not result in any adjustment of the other axis.

In order to achieve the desired position of the torsion joints 36 and 37 in the neutral axis, the reflector 1 is to be inserted by its mounting 3 into the free inner space of the inner ring 7 in such a way that the part of the ellipsoid from the vertex to the focal point is received within the free inner space.

In the same way as described above for an ellipsoid mirror, the axial adjustment device 23 according to the invention and the tilting device 8 can also be employed for other components where high-precision setting is important. This applies, for example, to sets of lenses in an objective lens, which are again suspended at defined points in a cardanic suspension as described, previously in order to achieve the desired adjustment effect. In this arrangement, individual lenses or even the entire set can be exactly adjusted accordingly. In principle, the apparatus can be used wherever very precise adjustment or bracing relative to a median access is necessary, and this can be done without wobble phenomena occurring.

The lamp 2 is, adjustable in three axes (x, y, z) independently of the reflector. The adjustment is built into the interior of the apparatus. As a result of adjustment of the lamp 2 and reflector 1, the second focus can be selectively set to a predetermined point.

What is claimed is:

1. A precision positioning apparatus for positioning a component in an axial direction, comprising an axial adjustment device which possesses a spindle onto which an adjusting nut can be screwed, the adjusting nut being composed of a guide ring and a clamping ring and the two rings being connected to one another elastically, the clamping ring being capable of being braced against the guide ring via clamping members to eliminate the lateral play of the adjusting nut, wherein individual clamping jaws are formed by incisions in the clamping ring and can each be braced with the guide ring via the clamping members.

2. A precision positioning apparatus for positioning a component in an axial direction and for tilting the component, comprising an axial adjustment device according to claim 1 and a tilting device.

3. The positioning apparatus as claimed in claim 2, wherein the tilting device possesses an inner tilting part and an outer tilting part, the inner tilting part being connected directly to the component to be tilted and being connected externally via torsion joints to the outer tilting part, which in turn is connected via torsion joints to a bearing part.

4. The positioning apparatus as claimed in claim 2, wherein the tilting device possesses an inner tilting part and an outer tilting part, the inner tilting part being connected indirectly to the component to be tilted and being connected externally via torsion joints to the outer tilting part, which in turn is connected via torsion joints to a bearing part.

5. The positioning apparatus as claimed in claim 1, wherein at least three clamping jaws, arranged distributed over the circumference of the clamping ring, are formed by axial incisions.

6. The positioning apparatus as claimed in claim 5, wherein the clamping jaws are formed as annular segments.

7. The positioning apparatus as claimed in claim 3, wherein the inner tilting part is formed as an inner ring which is surrounded by an outer ring as an outer tilting part.

8. The positioning apparatus as claimed in claim 7, wherein, in an ellipsoid mirror, the reflector of the ellipsoid mirror projects as an optical component from its focus to its vertex within the inner ring.

9. The positioning apparatus as claimed in claim 8, wherein the torsion joints are so arranged that their neutral axes point through the focus of the ellipsoid mirror.

10. The positioning apparatus as claimed in claim 9, wherein torsion joints of a ring are arranged opposite one another and wherein the torsion joints of the two rings are offset relative to one another by 90°.

11. The positioning apparatus as claimed in claim 7, wherein the inner tilting part and the outer tilting part can each be tilted relative to the other by screws.

12. The positioning apparatus as claimed in claim 11, wherein tension screws and pressure screws are arranged in a pairwise cooperating manner as tilting adjustment screws.

13. The positioning apparatus as claimed in claim 3, wherein the optical component is a reflector of an ellipsoid mirror and is directly connected as a component to the inner tilting part.

14. The positioning apparatus as claimed in claim 3, wherein the optical component is a reflector of an ellipsoid mirror and is indirectly connected as a component to the inner tilting part.

15. The positioning apparatus as claimed in claim 3, wherein the inner tilting part as a component constitutes a mounting of a lens.

16. The positioning apparatus as claimed in claim 3, wherein the outer tilting part is connected via torsion joints to two reciprocally opposite bearing webs as a bearing part.

17. The positioning apparatus as claimed in claim 7, wherein the outer tilting part is connected via torsion joints to two reciprocally opposite bearing webs as a bearing part.

18. The positioning apparatus as claimed in claim 1, wherein said spindle is formed as a ring, its inner diameter being more than 80% of its outer diameter bearing a thread and its axial length being less than 20% of its outer diameter.

* * * * *

UNITED STATES PATENT AND TRADEMARK OFFICE
CERTIFICATE OF CORRECTION

PATENT NO.    : 6,603,615 B2
DATED         : August 5, 2003
INVENTOR(S)   : Frank Melzer et al.

It is certified that error appears in the above-identified patent and that said Letters Patent is hereby corrected as shown below:

Column 1,
Line 52, replace "setting and/or enact setting and adjustment of the tilt of a" with
-- setting and/or exact setting and adjustment of the tilt of a --

Column 2,
Line 54, replace "invention, provision may be wade for the torsion joints to be" with
-- invention, provision may be made for the torsion joints to be --
Line 59, replace "In this case the reflector of the ellipsoid is located within" with
-- In this case, the reflector of the ellipsoid is located within --

Column 3,
Line 12, replace "the, tensioning nut being shown." with -- tensioning nut being shown. --

Column 4,
Line 48, replace "in detail below, with reference to FIGS. 7 and 8, in" with -- in detail below with reference to FIGS. 7 and 8, in --
Line 66, replace "38 and screwed into 4 threaded hole in the plate 16, and a" with
-- 38 and screwed into a threaded hole in the plate 16, and a --

Column 5,
Line 41, replace "The lamp 2 is, adjustable in three axes (x, y, z)" with -- The lamp 2 is adjustable in three axes (x, y, z) --

Signed and Sealed this

Twentieth Day of July, 2004

JON W. DUDAS
*Acting Director of the United States Patent and Trademark Office*